(12) United States Patent
Na et al.

(10) Patent No.: US 12,168,710 B2
(45) Date of Patent: Dec. 17, 2024

(54) RUBBER COMPOSITION AND MOLDED ARTICLE MANUFACTURED THEREFROM

(71) Applicant: LG Chem, Ltd., Seoul (KR)

(72) Inventors: Youk Reol Na, Daejeon (KR); Jin Young Kim, Daejeon (KR); Jae Sun Choi, Daejeon (KR); No Ma Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 336 days.

(21) Appl. No.: 17/287,790

(22) PCT Filed: Sep. 3, 2020

(86) PCT No.: PCT/KR2020/011876
§ 371 (c)(1),
(2) Date: Apr. 22, 2021

(87) PCT Pub. No.: WO2021/045537
PCT Pub. Date: Mar. 11, 2021

(65) Prior Publication Data
US 2021/0395408 A1 Dec. 23, 2021

(30) Foreign Application Priority Data
Sep. 3, 2019 (KR) ......................... 10-2019-0108952

(51) Int. Cl.
| | | |
|---|---|---|
| C08F 36/06 | (2006.01) | |
| C08C 19/25 | (2006.01) | |
| C08F 2/06 | (2006.01) | |
| C08F 4/48 | (2006.01) | |
| C08L 9/00 | (2006.01) | |
| B60C 1/00 | (2006.01) | |

(52) U.S. Cl.
CPC .............. *C08F 36/06* (2013.01); *C08C 19/25* (2013.01); *C08F 2/06* (2013.01); *C08F 4/48* (2013.01); *C08L 9/00* (2013.01); *B60C 1/0016* (2013.01)

(58) Field of Classification Search
CPC .... C08F 36/06; C08F 2/06; C08F 4/48; C08F 2/38; C08F 2/04; C08F 4/545; C08F 4/565; C08F 36/04; C08F 2500/21; C08C 19/25; C08C 19/22; C08L 9/00; C08L 15/00; B60C 1/0016; B60C 1/00; Y02T 10/86; C08K 2003/2296; C08K 3/04; C08K 3/36
See application file for complete search history.

(56) References Cited

U.S. PATENT DOCUMENTS

| | | | | |
|---|---|---|---|---|
| 3,992,561 A | * | 11/1976 | Hargis | C08F 12/06 502/340 |
| 4,835,209 A | | 5/1989 | Kitagawa et al. | |
| 5,017,636 A | * | 5/1991 | Hattori | C08L 15/00 524/300 |
| 6,017,988 A | | 1/2000 | Blok et al. | |
| 6,025,430 A | | 2/2000 | Blok et al. | |
| 6,084,022 A | | 7/2000 | Blok et al. | |
| 6,390,163 B1 | | 5/2002 | Duddey | |
| 9,441,098 B1 | * | 9/2016 | Isitman | C08L 9/00 |
| 2008/0289740 A1 | | 11/2008 | Mori et al. | |
| 2009/0306269 A1 | * | 12/2009 | Ota | C08L 15/00 524/437 |
| 2014/0011944 A1 | | 1/2014 | Kondo | |
| 2014/0090764 A1 | | 4/2014 | Miyazaki | |
| 2014/0230984 A1 | | 8/2014 | Miyazaki | |
| 2015/0298512 A1 | | 10/2015 | Lim et al. | |
| 2016/0009846 A1 | | 1/2016 | Sato et al. | |
| 2016/0194411 A1 | * | 7/2016 | Lee | C08F 236/10 525/102 |
| 2018/0105683 A1 | | 4/2018 | Miyazaki | |
| 2018/0371125 A1 | | 12/2018 | Kim et al. | |
| 2019/0169404 A1 | | 6/2019 | Yamada | |
| 2019/0366770 A1 | | 12/2019 | Yoshioka et al. | |
| 2021/0023882 A1 | | 1/2021 | Miyazaki | |

FOREIGN PATENT DOCUMENTS

| | | |
|---|---|---|
| CA | 2246038 A1 | 3/1999 |
| CA | 2282953 A1 | 4/2000 |
| CN | 105017571 A | 11/2015 |
| CN | 105612184 A | 5/2016 |
| CN | 106947129 A | 7/2017 |
| CN | 108473616 A | 8/2018 |
| CN | 108864497 A | 11/2018 |
| EP | 2749404 A1 | 7/2014 |
| EP | 3281979 A1 | 2/2018 |
| EP | 3401121 A1 | 11/2018 |
| EP | 3647351 A1 | 5/2020 |
| JP | H07118446 A | 5/1995 |
| JP | 3494575 B2 | 2/2004 |
| JP | 2010254852 A | 11/2010 |

(Continued)

OTHER PUBLICATIONS

International Search Report for Application No. PCT/KR2020/011876, mailed Dec. 14, 2020, 2 pages.

(Continued)

*Primary Examiner* — Robert C Boyle
(74) *Attorney, Agent, or Firm* — Lerner David LLP

(57) ABSTRACT

A rubber composition having excellent abrasion resistance and improved viscoelasticity properties, and a tire manufactured using the same are disclosed herein. In some embodiments, a rubber composition includes a first synthetic rubber and a second synthetic rubber, and has an interaction parameter ($\chi_{blend}$) defined by Mathematical Formula 1 at room temperature is $2.0 \times 10^{-3}$ or more. The first synthetic rubber is a solution-polymerized modified conjugated diene-based rubber which has a 1,2-vinyl bond content of 50 wt % or more and includes a functional group bonded to at least one terminal, and the second synthetic rubber is a conjugated diene-based rubber which has a 1,2-vinyl bond content of less than 50 wt %.

10 Claims, 1 Drawing Sheet

(56) References Cited

FOREIGN PATENT DOCUMENTS

| | | | |
|---|---|---|---|
| JP | 2013018868 A | 1/2013 |
| JP | 2013233788 A | 11/2013 |
| JP | 2015189970 A | 11/2015 |
| JP | 2016204504 A | 12/2016 |
| JP | 2017141429 A | 8/2017 |
| JP | 2019099745 A | 6/2019 |
| KR | 880700015 A | 2/1988 |
| KR | 20130071620 A | 7/2013 |
| KR | 20150012063 A | 2/2015 |
| KR | 20150110668 A | 10/2015 |
| KR | 20180038146 A | 4/2018 |
| WO | 2012165038 A1 | 12/2012 |
| WO | 2019017067 A1 | 1/2019 |

OTHER PUBLICATIONS

Extended European Search Report including Written Opinion for Application No. 20861674.8 dated Dec. 6, 2021, pp. 1-5.

* cited by examiner

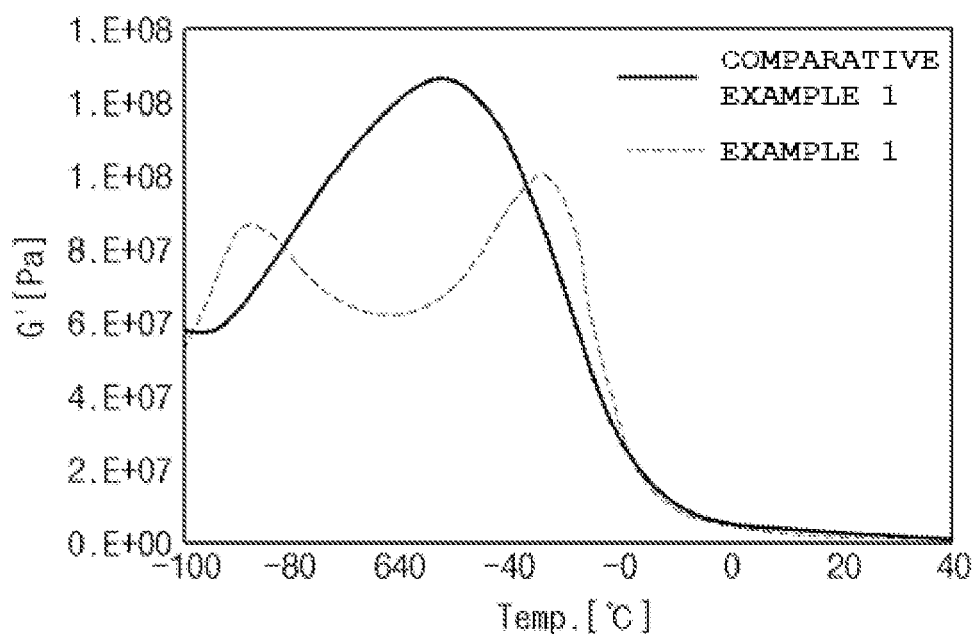

RUBBER COMPOSITION AND MOLDED ARTICLE MANUFACTURED THEREFROM

CROSS-REFERENCE TO RELATED APPLICATIONS

The present application is a national phase entry under 35 U.S.C. § 371 of International Application No. PCT/KR2020/011876, filed on Sep. 3, 2020, which claims priority from Korean Patent Application No. 10-2019-0108952, filed on Sep. 3, 2019, the entire contents of which are incorporated by reference herein.

TECHNICAL FIELD

The present invention relates to a rubber composition having excellent abrasion resistance and improved viscoelasticity properties by controlling compatibility among rubber components, and a tire manufactured using the same.

BACKGROUND ART

Recently, according to the demand for cars having a low fuel consumption ratio, the decrease of rolling resistance of tires is required, and tires having modulational stability represented by wet skid resistance as well as excellent abrasion resistance and tensile properties in respect of safety are required. Accordingly, a method for coexisting low rolling resistance and modulational stability by combining a filler such as silica with rubber components constituting a tire, particularly, a tire tread part, has been known.

For example, in order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers.

In addition, carbon black, silica, etc. are used as a reinforcing filler of a tire tread, and if the silica is used as the reinforcing filler, advantages of improving low hysteresis loss and wet skid resistance are achieved. However, silica at a hydrophilic surface has low affinity with a rubber component when compared with carbon black at a hydrophobic surface and agglomeration among silica is increased, and thus, a separate silane coupling agent is required to improve dispersibility or impart coupling between silica-rubber. Accordingly, a method of introducing a functional group having affinity or reactivity with silica at the terminal of a rubber molecule is conducted, but the effects thereof are insufficient.

PRIOR ART DOCUMENT (Patent Document 1) KR 2015-0110668 A

DISCLOSURE OF THE INVENTION

Technical Problem

The present invention has been devised to solve the above-mentioned problems of the conventional technique, and an object is to provide a rubber composition having excellent abrasion resistance and improved viscoelasticity properties by controlling compatibility among rubber components.

In addition, another object of the present invention is to provide a tire manufactured using the rubber composition.

Technical Solution

To solve the above-mentioned tasks, the present invention provides a rubber composition including a first synthetic rubber; and a second synthetic rubber, wherein the first synthetic rubber is a solution-polymerized modified conjugated diene-based rubber which has a 1,2-vinyl bond content of 50 wt % or more and of which at least one terminal is bonded to a functional group, the second synthetic rubber is a conjugated diene-based rubber which has a 1,2-vinyl bond content of less than 50 wt %, and an interaction parameter ($\chi_{blend}$) defined by the following Mathematical Formula 1 at room temperature is $2.0 \times 10^{-3}$ or more:

$$X_{blend} = K\varphi_S X_{VS} + (\varphi_S - K)\varphi_S X_{BS} - K(\varphi_S - K)X_{VB} \quad \text{[Mathematical Formula 1]}$$

in Mathematical Formula 1,

K is $Y-X(1-\varphi_S)$, $\varphi_s$ is a volume ratio of a styrene bond in the first synthetic rubber, X is a volume ratio of a 1,2-vinyl bond in the first synthetic rubber, Y is a volume ratio of a 1,2-vinyl bond in the second synthetic rubber, $X_{VS}$ is $0.05650+5.65\ T^{-1}$, $X_{BS}$ is $0.00843+10.2\ T^{-1}$, and $X_{VB}$ is $0.00269+1.87\ T^{-1}$.

In addition, there is provided in the present invention a molded article manufactured using the rubber composition.

Advantageous Effects

The rubber composition according to the present invention includes heterogeneous rubber components of a first synthetic rubber and a second synthetic rubber, wherein the first synthetic rubber and the second synthetic rubber are selected and included so that an interaction parameter between them is in a specific range so as to control compatibility between rubbers, thereby achieving excellent abrasion resistance and improved viscoelasticity properties.

In addition, the rubber composition includes a solution-polymerized modified conjugated diene-based rubber in which a functional group is bonded to at least one terminal, as the first synthetic rubber, and may have even better affinity with a filler and further improved dispersibility of the filler in the rubber composition, thereby largely improving viscoelasticity properties.

BRIEF DESCRIPTION OF THE DRAWINGS

The following drawing attached to the disclosure illustrates preferred examples of the present invention, and serves to enable technical concepts of the present invention to be further understood together with detailed description of the invention given below, and therefore the present invention should not be interpreted only with matters in such drawing.

The FIGURE shows a graph on G" (dynamic loss modulus) change in accordance with the temperature of rubber compositions of Example 1 according to an embodiment of the present invention, and Comparative Example 1.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "interaction parameter ($\chi_{blend}$)" used in the present invention is a characteristic value which is the measure of phase equilibrium between rubbers, and was calculated by Mathematical Formula 1 below, which is a known calculation formula of interaction parameter (see Journal of Applied Polymer Science, Vol. 51, No. 6, pp 1053-1062).

$$X_{blend}=K\varphi_S X_{VS}+(\varphi_S-K)\varphi_S X_{BS}-K(\varphi_S-K)X_{VB} \quad \text{[Mathematical Formula 1]}$$

In Mathematical Formula 1,

K is Y−X(1−$\varphi_S$), $\varphi_s$ is a volume ratio of a styrene bond in the first synthetic rubber, X is a volume ratio of a 1,2-vinyl bond in the first synthetic rubber, Y is a volume ratio of a 1,2-vinyl bond in the second synthetic rubber, $X_{VS}$ is 0.05650+5.65 $T^{-1}$, $X_{BS}$ is 0.00843+10.2 $T^{-1}$, and $X_{VB}$ is 0.00269+1.87 $T^{-1}$. Here, the T means a unit, a unit of absolute temperature (K).

Here, the volume ratio of a styrene bond and the volume ratio of 1,2-vinyl bond in the rubber may be values obtained by measuring and analyzing using Varian VNMR 500 MHz NMR. Particularly, the ratios of the styrene bond and 1,2-vinyl bond were calculated and by using 1,1,2,2-tetrachloroethane as a solvent during measurement, and regarding 5.97 ppm as a solvent peak, 7.2-6.9 ppm as random styrene peaks, 6.9-6.2 ppm as block styrene peaks, 5.8-5.1 ppm as 1,4-vinyl bond peaks, and 5.1-4.5 ppm as 1,2-vinyl bond peaks.

The term "room temperature" used in the present invention means the temperature in a natural state without heating or cooling, for example, a temperature of 20±5° C.

The term "derived repeating unit" used in the present invention may represent a component or a structure comes from a certain material, or the material itself, and for example, a repeating unit derived from a conjugated diene-based monomer may mean a repeating unit formed by a conjugated diene-based monomer during polymerization.

The present invention provides a rubber composition having excellent abrasion resistance and improved viscoelasticity properties.

The rubber composition according to an embodiment of the present invention is characterized in including a first synthetic rubber; and a second synthetic rubber, wherein the first synthetic rubber is a solution-polymerized modified conjugated diene-based rubber which has a 1,2-vinyl bond content of 50 wt % or more and of which at least one terminal is bonded to a functional group, the second synthetic rubber is a conjugated diene-based rubber which has a 1,2-vinyl bond content of less than 50 wt %, and an interaction parameter ($\chi_{blend}$) defined by Mathematical Formula 1 above is $2.0 \times 10^{-3}$ or more.

In addition, the rubber composition may further include a filler, and particularly, the rubber composition may include 30 parts by weight to 90 parts by weight of the first synthetic rubber, 10 parts by weight to 90 parts by weight of the second synthetic rubber, and 30 parts by weight to 200 parts by weight of the filler, based on 100 parts by weight of a rubber component including the first synthetic rubber and the second synthetic rubber.

The rubber composition according to an embodiment of the present invention incudes heterogeneous rubber components of the first synthetic rubber and the second synthetic rubber, but the first synthetic rubber and the second synthetic rubber are selected so that an interaction parameter between them is in a specific range as described above, and thus, compatibility among rubber components may be controlled, and physical properties of each of the first synthetic rubber and the second synthetic rubber may be shown at the same time. As a result, abrasion resistance may be excellent and viscoelasticity properties may be improved.

In addition, since the rubber composition according to an embodiment of the present invention includes a solution-polymerized modified conjugated diene-based rubber in which a functional group is bonded to at least one terminal, as the first synthetic rubber, affinity with a filler may become even more excellent, and thus, viscoelasticity properties may be further improved.

Particularly, the rubber composition may have an interaction parameter ($\chi_{blend}$) defined by Mathematical Formula 1 of $2.0 \times 10^{-3}$ or more, particularly, $2.5 \times 10^{-3}$ or more, more particularly, $3.0 \times 10^{-3}$ or more. Here, the interaction parameter may be a value equal to or greater than the aforementioned numerical, and an upper limit is not particularly limited as long as the object of the present invention is not adversely affected, and may be, for example, $10.0 \times 10^{-3}$ or less, or $8.0 \times 10^{-3}$ or less. If the interaction parameter of the first synthetic rubber and the second synthetic rubber is in the above-described range, compatibility among rubber components may be controlled, and physical properties of each of the first synthetic rubber and the second synthetic rubber may be shown simultaneously without degradation, and accordingly, a rubber composition including thereof may have excellent tensile properties and viscoelasticity properties.

Here, the interaction parameter is a parameter which is an interaction measurement determined according to the microstructure (1,2-vinyl bond and styrene bond) in a rubber, and may be controlled by the ratio of the first synthetic rubber and second synthetic rubber included in the rubber composition and the microstructure in each synthetic rubber.

Hereinafter, each component included in the rubber composition according to an embodiment of the present invention will be explained in particular.

First Synthetic Rubber

In an embodiment of the present invention, the first synthetic rubber may be a solution-polymerized modified conjugated diene-based rubber which has the 1,2-vinyl bond content of 50 wt % or more and a functional group is bonded to at least one terminal thereof.

Particularly, the solution-polymerized modified conjugated diene-based rubber may be one in which a styrene bond is not present, that is, having the styrene bond content of 0 wt %, and in this case, the solution-polymerized modified conjugated diene-based rubber may be polymerized without applying an aromatic vinyl-based monomer.

More particularly, the first synthetic rubber may be a solution-polymerized modified conjugated diene-based rubber, and in the modified conjugated diene-based rubber, a styrene bond is not present, and the 1,2-vinyl bond content may be 50 wt % to 90 wt %, or 60 wt % to 90 wt %, and in this case, excellent effects of abrasion resistance, wet skid resistance and a low fuel consumption ration may be achieved.

In another embodiment, the first synthetic rubber may be a solution-polymerized modified conjugated diene-based rubber, and may have a glass transition temperature of −60° C. to −10° C. Meanwhile, the glass transition temperature may be generally influenced by the microstructure of a rubber, for example, by the 1,2-vinyl bond content, cis-1,4 bond content, trans-1,4 bond content and styrene bond content. For example, with the increase of the styrene bond content and the 1,2-vinyl bond content in the rubber, the glass transition temperature may increase but may not definitely increase with the increase the styrene bond content and the 1,2-vinyl bond content.

In another embodiment, the first synthetic rubber may be a solution-polymerized modified conjugated diene-based rubber, wherein a styrene bond is not present, the 1,2-vinyl bond content may be 50 wt % to 90 wt %, or 60 wt % to 90 wt %, and a glass transition temperature may be −60° C. to −10° C. In this case, effects of even better excellent abrasion resistance, wet skid resistance and rotation resistance may be achieved.

Here, the 1,2-vinyl content may mean the amount of 1,2-added conjugated diene-based monomer in the solution-polymerized modified conjugated diene-based rubber.

In addition, the first synthetic rubber may include an extender oil according to the viscosity of a rubber composition including thereof, and in this case, the processability of the rubber composition may be further improved.

In addition, in the solution-polymerized modified conjugated diene-based rubber according to an embodiment of the present invention, a functional group may be bonded to at least one terminal thereof, and in this case, the functional group may be any one or more selected among an amine group and an aminoalkoxysilane group. Particularly, the first synthetic rubber according to an embodiment of the present invention may be a solution-polymerized modified conjugated diene-based rubber in which functional groups are bonded to one terminal or both terminals. In case where the first synthetic rubber is a solution-polymerized modified conjugated diene-based rubber in which a functional group is bonded to one terminal, one or more among the amine group and the aminoalkoxysilane group may be bonded to one terminal, and in case where the first synthetic rubber is a solution-polymerized modified conjugated diene-based rubber in which functional groups are bonded to both terminals, the amine groups or the aminoalkoxysilane groups may be bonded to both terminals, or the amine group is bonded to one terminal and the aminoalkoxysilane group is bonded to the other terminal.

In addition, the first synthetic rubber may have a number average molecular weight (Mn) of 20,000 g/mol to 800,000 g/mol, 100,000 g/mol to 550,000 g/mol, or 150,000 g/mol to 500,000 g/mol, and a weight average molecular weight (Mw) of 40,000 g/mol to 2,000,000 g/mol, 150,000 g/mol to 900,000 g/mol, or 200,000 g/mol to 800,000 g/mol. Within these ranges, rolling resistance and wet skid resistance are excellent. In another embodiment, the solution-polymerized conjugated diene-based rubber may have molecular weight distribution (Mw/Mn) of 1.0 to 4.0, 1.1 to 3.5, or 1.3 to 3.0, and within this range, balance among physical properties is excellent.

Here, the weight average molecular weight (Mw) and the number average molecular weight (Mn) are polystyrene converted molecular weights analyzed by gel permeation chromatography (GPC), respectively, and the molecular weight distribution (Mw/Mn) is also referred to as polydispersity and was calculated as a ratio (Mw/Mn) of the weight average molecular weight (Mw) and the number average molecular weight (Mn).

In another embodiment, the first synthetic rubber may have mooney viscosity at 100° C. of 40 to 120, or 50 to 100, and within this range, processability and productivity are excellent. In this case, the first synthetic rubber may not include an extender oil.

Here, the mooney viscosity was measured by using a mooney viscometer, for example, using a Large Rotor of MV2000E (ALPHA Technologies Co.) at a rotor speed of 2±0.02 rpm at 100° C. and 140° C. Particularly, a polymer was stood at room temperature (23±3° C.) for 30 minutes or more, and 27±3 g of the polymer was collected and put in a die cavity, and then, Platen was operated while applying torque and measurement was performed.

Meanwhile, the first synthetic rubber according to an embodiment of the present invention may be prepared by polymerizing a conjugated diene-based monomer in a hydrocarbon solvent including a polymerization initiator to prepare an active polymer which is coupled with a functional group derived from a modification initiator and an organometal, and then reacting the active polymer thus prepared with a modifier.

The hydrocarbon solvent is not specifically limited, but may be, for example, one or more selected from the group consisting of n-pentane, n-hexane, n-heptane, isooctane, cyclohexane, toluene, benzene and xylene.

The conjugated diene-based monomer is not specifically limited, but may be, for example, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, or 2,4-hexadiene, and may particularly be 1,3-butadiene.

The polymerization initiator may be an organometal compound or a modification initiator, and in case of using the modification initiator as the polymerization initiator, functional groups may be coupled at both terminals the first synthetic rubber prepared.

The organometal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide.

In addition, the modification initiator may be a compound prepared by reacting the organometal compound and an amine group-containing compound, and the amine group-containing compound may be, for example, a compound represented by Formula 1 below.

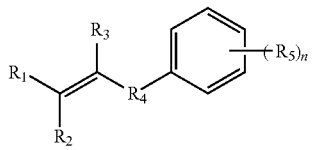

[Formula 1]

In Formula 1, $R_1$ to $R_3$ are each independently hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 3 to 30 carbon atoms; an aryl group of 6 to 30 carbon atoms; or a heterocyclic group of 3 to 30 carbon atoms, $R_4$ is a single bond; a substituted with a substituent or unsubstituted alkylene group of 1 to 20 carbon atoms; a substituted with a substituent or unsubstituted cycloalkylene group of 3 to 20 carbon atoms; or a substituted with a substituent or unsubstituted arylene group of 6 to 20 carbon atoms, wherein the substituent is an alkyl group of 1 to 10 carbon atoms, a cycloalkyl group of 3 to 10 carbon atoms, or an aryl group of 6 to 20 carbon atoms, $R_5$ is an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 3 to 30 carbon atoms; an aryl group of 6 to 30 carbon atoms; a heterocyclic group of 3 to 30 carbon atoms; or a functional group represented by Formula 1a or Formula 1b below, n is an integer of 1 to 5, and at least one of $R_5$ groups is a functional group represented by Formula 1a or Formula 1b below, in case where n is an integer of 2 to 5, a plurality of $R_5$ groups may be the same or different,

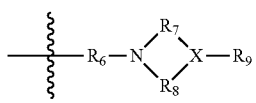

[Formula 1a]

in Formula 1a, $R_6$ is a substituted with a substituent or unsubstituted alkylene group of 1 to 20 carbon atoms; a substituted with a substituent or unsubstituted cycloalkylene group of 3 to 20 carbon atoms; or a substituted with a substituent or unsubstituted arylene group of 6 to 20 carbon atoms, wherein the substituent is an alkyl group of 1 to 10 carbon atoms, a cycloalkyl group of 3 to 10 carbon atoms, or an aryl group of 6 to 20 carbon atoms, $R_7$ and $R_8$ are each independently an alkyl group of 1 to 10 carbon atoms, a cycloalkyl group of 3 to 10 carbon atoms, or a substituted with an aryl group of 6 to 20 carbon atoms or unsubstituted alkylene group of 1 to 20 carbon atoms, $R_9$ is hydrogen; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 3 to 30 carbon atoms; an aryl group of 6 to 30 carbon atoms; or a heterocyclic group of 3 to 30 carbon atoms, and X is an N, O or S atom, in case where X is O or S, $R_9$ is not present,

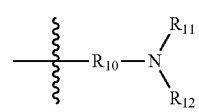

[Formula 1b]

in Formula 1b, $R_{10}$ is a substituted with a substituent or unsubstituted alkylene group of 1 to 20 carbon atoms; a substituted with a substituent or unsubstituted cycloalkylene group of 3 to 20 carbon atoms; or a substituted with a substituent or unsubstituted arylene group of 6 to 20 carbon atoms, wherein the substituent is an alkyl group of 1 to 10 carbon atoms, a cycloalkyl group of 3 to 10 carbon atoms, or an aryl group of 6 to 20 carbon atoms, and $R_{11}$ and $R_{12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 3 to 30 carbon atoms; an aryl group of 6 to 30 carbon atoms; or a heterocyclic group of 3 to 30 carbon atoms.

In another embodiment, the amine group-containing compound may be a compound represented by Formula 2 below.

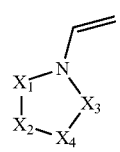

[Formula 2]

In Formula 2, $X_1$-$X_2$ is $CH_2$—$CH_2$ or CH=CH, and
$X_3$-$X_4$ is $CH_2$—$CH_2$, CH=N or N=N.

In another embodiment, the amine group-containing compound may be a compound represented by Formula 3 below.

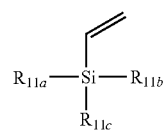

[Formula 3]

In Formula 3, $R_{11a}$ and $R_{11b}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a functional group represented by Formula 4a below, $R_{11c}$ is an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; a vinyl group; or a functional group represented by Formula 3a below, where at least one among $R_{11a}$, $R_{11b}$ and $R_{11c}$ is a functional group represented by Formula 3a.

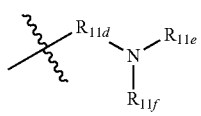

[Formula 3a]

In Formula 3a, $R_{11d}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and $R_{11e}$ and $R_{11f}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

In another embodiment, the amine group-containing compound may be a compound represented by Formula 4 below.

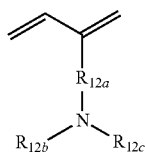

[Formula 4]

In Formula 4, $R_{12a}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and $R_{12b}$ and $R_{12c}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

Meanwhile, the polymerization may be performed by using a polar additive, and the polar additive may easily control the 1,2-vinyl bond content in the polymer thus prepared according to the amount used of the polar additive. That is, the polar additive may be used as a means for controlling the microstructure of the polymer thus prepared, for example, for controlling the 1,2-vinyl bond content.

The polar additive may be added in a ratio of 0.001 g to 50 g, 0.001 g to 10 g or 0.005 g to 0.1 g based on total 100 g of the monomer. In another embodiment, the polar additive may be added in a ratio of 0.001 g to 10 g, 0.005 g to 5 g, 0.005 g to 4 g based on total 1 mmol of the polymerization initiator.

In addition, the polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium mentholate and 2-ethyl tetrahydrofufuryl ether, preferably, 2,2-di(2-tetrahydrofuryl) propane, triethylamine, tetramethylethylenediamine, sodium mentholate or 2-ethyl tetrahydrofufuryl ether. If the polar additive is included, and if a conjugated diene-based monomer and an aromatic vinyl-based monomer are copolymerized, the difference of their reaction rates may be compensated, and effects of inducing easy formation of a random copolymer may be achieved.

In addition, the modifier may be, for example, a compound represented by Formula 5 below.

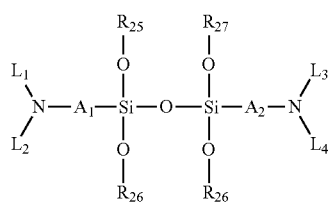

[Formula 5]

In Formula 5, $A_1$ and $A_2$ are each independently an alkylene group of 1 to 20 carbon atoms, $R_{25}$ to $R_{28}$ are each independently an alkyl group of 1 to 20 carbon atoms, and $L_1$ and $L_2$, and $L_3$ and $L_4$ are connected with each other to form rings of 1 to 5 carbon atoms, respectively, where the rings formed by connecting $L_1$ and $L_2$, and $L_3$ and $L_4$ with each other include one to three heteroatoms which of one or more selected from the group consisting of N, O and S.

In addition, the modifier may be, for example, a compound represented by Formula 6 below.

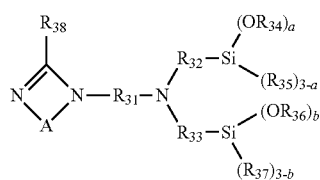

[Formula 6]

In Formula 6, $R_{31}$ to $R_{33}$ are each independently an alkylene group of 1 to 10 carbon atoms, $R_{34}$ to $R_{37}$ are each independently an alkyl group of 1 to 10 carbon atoms, $R_{38}$ is hydrogen or an alkyl group of 1 to 10 carbon atoms, a and b are each independently an integer of 0 to 3, where $a+b \geq 1$, and A is

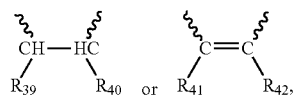

where $R_{39}$ to $R_{42}$ are each independently hydrogen or an alkyl group of 1 to 10 carbon atoms.

Second Synthetic Rubber

In an embodiment of the present invention, the second synthetic rubber may be a conjugated diene-based rubber catalyzed with a rare earth metal catalyst, a transition metal catalyst or an alkali metal catalyst, particularly, a neodymium-catalyzed conjugated diene-based rubber, a nickel-catalyzed conjugated diene-based rubber, a cobalt-catalyzed conjugated diene-based rubber, or a lithium-catalyzed conjugated diene-based rubber, and any one prepared or commercially available may be used as long as it is included in a rubber composition together with the first synthetic rubber to satisfy the interaction parameter of a rubber composition in the above-described range.

Here, the conjugated diene-based rubber catalyzed with a catalyst may represent a conjugated diene-based rubber including an organometal part activated by the catalyst, and in this case, the conjugated diene-based rubber may be a butadiene homopolymer such as polybutadiene or a butadiene copolymer such as a butadiene-isoprene copolymer.

Here, if the conjugated diene-based rubber is a butadiene homopolymer, the butadiene homopolymer may be prepared by polymerizing a 1,3-butadiene-based monomer, and the 1,3-butadiene-based monomer may be 1,3-butadiene, 2,3-dimethyl-1,3-butadiene or 2-ethyl-1,3-butadiene. If the conjugated diene-based rubber is a butadiene copolymer, it may be prepared by copolymerizing a 1,3-butadiene-based monomer with other conjugated diene-based monomers which are copolymerizable therewith, and the other conjugated diene-based monomers which are copolymerizable therewith may include 2-methyl-1,3-pentadiene, 1,3-pentadiene, 3-methyl-1,3-pentadiene, 4-methyl-1,3-pentadiene, 1,3-hexadiene or 2,4-hexadiene.

Here, the second synthetic rubber may have the 1,2-vinyl bond content of less than 50 wt %, particularly, 40 wt % or less.

Particularly, the second synthetic rubber may be a neodymium-catalyzed conjugated diene-based rubber or a lithium-catalyzed conjugated diene-based rubber, and more particularly, the second synthetic rubber may be a neodymium-catalyzed conjugated diene-based rubber having the cis 1,4-bond content of 96 wt % or more and the 1,2-vinyl bond content of 5 wt % or less, or a lithium-catalyzed conjugated diene-based rubber having the cis 1,4-bond content of 10 wt % to 30 wt % and the 1,2-vinyl bond content of 15 wt % or less.

Meanwhile, the second synthetic rubber may be a modified conjugated diene-based rubber in which a functional group is bonded to at least one terminal thereof, and in this case, the functional group may be one or more selected from an amine group and an aminoalkoxysilane group, and the functional group may be derived from a modifier. Here, the modifier may be the same as defined above.

In addition, the second synthetic rubber may have a number average molecular weight (Mn) of 20,000 g/mol to 800,000 g/mol, 100,000 g/mol to 550,000 g/mol, or 150,000 g/mol to 500,000 g/mol, and a weight average molecular weight (Mw) of 40,000 g/mol to 2,000,000 g/mol, 150,000 g/mol to 900,000 g/mol, or 200,000 g/mol to 800,000 g/mol, and within these ranges, balance between physical properties may be excellent.

Here, the weight average molecular weight (Mw) and the number average molecular weight (Mn) were measured by the method described above.

Meanwhile, the second synthetic rubber according to an embodiment of the present invention may be prepared by using a well-known common method for preparing a conjugated diene-based polymer as long as a microstructure, for example, 1,2-vinyl bond content, which may fulfill the interaction parameter defined by Mathematical Formula 1 above in the relation with the first synthetic rubber may be obtained.

For example, the second synthetic rubber may be prepared by polymerizing a 1,3-butadiene-based monomer or a 1,3-butadiene-based monomer and a conjugated diene-based monomer which is copolymerizable therewith in the presence of a catalyst composition including a main catalyst compound, and modification reaction or coupling reaction with a modifier may be further performed after the polymerization as necessary. Here, the main catalyst compound may be a rare earth metal-containing compound, a transition metal-containing compound or an alkali metal-containing compound, and particularly may be a neodymium-containing compound, a nickel-containing compound, a cobalt-containing compound or a lithium-containing compound, more particularly, a neodymium-containing compound, or a lithium-containing compound. The neodymium-containing compound may include neodymium carboxylates (e.g., neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, or neodymium neodecanoate); organophosphates (e.g., neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, or neodymium didecyl phosphate); organophosphonates (e.g., neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, or neodymium octadecyl phosphonate); organophosphinates (e.g., neodymium butylphosphinate, neodymium pentylphosphinate, neodymium hexylphosphinate, neodymium heptylphosphinate, neodymium octylphosphinate, neodymium (1-methylheptyl)phosphinate, or neodymium (2-ethylhexyl) phosphinate); carbamates (e.g., neodymium dimethylcarbamate, neodymium diethylcarbamate, neodymium diisopropylcarbamate, neodymium dibutylcarbamate, or neodymium dibenzylcarbamate); dithiocarbamates (e.g., neodymium dimethyldithiocarbamate, neodymium diethyldithiocarbamate, neodymium diisopropyldithiocarbamate, or neodymium dibutyldithiocarbamate); xanthates (e.g., neodymium methylxanthate, neodymium ethylxanthate, neodymium isopropylxanthate, neodymium butylxanthate, or neodymium benzylxanthate); β-diketonates (e.g., neodymium acetylacetonate, neodymium trifluoroacetylacetonate, neodymium hexafluoroacetylacetonate, or neodymium benzoylacetonate); alkoxides or allyloxides (e.g., neodymium methoxide, neodymium ethoxide, neodymium isopropoxide, neodymium phenoxide, or neodymium nonylphenoxide); halides or pseudo-halides (e.g., neodymium fluoride, neodymium chloride, neodymium bromide, neodymium iodide, neodymium cyanide, neodymium cyanate, neodymium thiocyanate, or neodymium azide); oxyhalides (e.g., neodymium oxyfluoride, neodymium oxychloride, or neodymium oxybromide); or organoneodymium-containing compounds including one or more neodymium-carbon bonds (e.g., $Cp_3Nd$, $Cp_2NdR$, $Cp_2NdCl$, $CpNdCl_2$, $CpNd$ (cyclooctatetraene), $(C_5Me_5)_2NdR$, $NdR_3$, $Nd(allyl)_3$, or $Nd(allyl)_2Cl$, where R represents a hydrocarbyl group), and may include any one thereof or mixtures of two or more thereof.

Particularly, the neodymium-containing compound may include a neodymium compound represented by Formula 7 below.

[Formula 7]

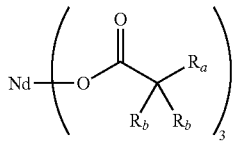

In Formula 7, $R_a$ to $R_c$ are each independently hydrogen or an alkyl group having 1 to 12 carbon atoms, but all $R_a$ to $R_c$ are not hydrogen at the same time.

More particularly, the neodymium compound may be one or more selected from the group consisting of $Nd(2\text{-ethylhexanoate})_3$, $Nd(2,2\text{-dimethyl decanoate})_3$, $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $(2\text{-decanoate})_3$, $Nd(2\text{-propyl-2-hexyl decanoate})_3$, $Nd(2 \text{ propyl-2-isopropyl decanoate})_3$, $Nd(2\text{-butyl-2-hexyl decanoate})_3$, $Nd(2\text{-hexyl-1-octyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl-2-propyl octanoate})_3$, $Nd(2\text{-ethyl-2hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2-propyl nonanoate})_3$, and $Nd(2\text{-ethyl-2-hexyl nonanoate})_3$.

In addition, in another embodiment, in consideration of excellent solubility in a solvent without a concern for oligomerization, a conversion ratio to a catalytically active species, and the resulting excellent improving effects of catalytic activity, the neodymium compound may particularly be a neodymium compound of Formula 4, where $R_a$ is an alkyl group having 4 to 12 carbon atoms, and $R_b$ and $R_c$ are each independently hydrogen or an alkyl group having 2 to 8 carbon atoms, but $R_b$ and $R_c$ are not hydrogen at the same time.

In a more particular embodiment, in Formula 7, $R_a$ may be an alkyl group having 6 to 8 carbon atoms, and $R_b$ and $R_c$ may be each independently hydrogen or an alkyl group having 2 to 6 carbon atoms, where $R_b$ and $R_c$ may not be hydrogen at the same time. Particular examples of the neodymium compound may be one or more selected from the group consisting of $Nd(2,2\text{-diethyl decanoate})_3$, $Nd(2,2\text{-dipropyl decanoate})_3$, $Nd(2,2\text{-dibutyl decanoate})_3$, $Nd(2,2\text{-dihexyl decanoate})_3$, $Nd(2,2\text{-dioctyl decanoate})_3$, $Nd(2\text{-ethyl-2-propyl decanoate})_3$, $Nd(2\text{-ethyl-2-butyl decanoate})_3$, $Nd(2\text{-ethyl-2-hexyl decanoate})_3$, $Nd(2\text{-propyl-2-butyl decanoate})_3$, $Nd(2\text{-propyl-2-hexyl decanoate})_3$, $Nd(2\text{-propyl-2-isopropyl decanoate})_3$, $Nd(2\text{-butyl-2-hexyl decanoate})_3$, $Nd(2\text{-hexyl-1-octyl decanoate})_3$, $Nd(2\text{-t-butyl decanoate})_3$, $Nd(2,2\text{-diethyl octanoate})_3$, $Nd(2,2\text{-dipropyl octanoate})_3$, $Nd(2,2\text{-dibutyl octanoate})_3$, $Nd(2,2\text{-dihexyl octanoate})_3$, $Nd(2\text{-ethyl-2-propyl octanoate})_3$, $Nd(2\text{-ethyl-2-hexyl octanoate})_3$, $Nd(2,2\text{-diethyl nonanoate})_3$, $Nd(2,2\text{-dipropyl nonanoate})_3$, $Nd(2,2\text{-dibutyl nonanoate})_3$, $Nd(2,2\text{-dihexyl nonanoate})_3$, $Nd(2\text{-ethyl-2 propyl nonanoate})_3$, and $Nd(2\text{-ethyl-2-hexyl nonanoate})_3$, and among them, the neodymium-based compound may be one or more selected from the group consisting of $Nd(2,2\text{-diethyl decanoate})_3$, $Nd(2,2\text{-dipropyl decanoate})_3$, $Nd(2,2\text{-dibutyl decanoate})$, $Nd(2,2\text{-dihexyl decanoate})_3$, and $Nd(2,2\text{-dioctyl decanoate})$.

More particularly, in Formula 7, $R_a$ may be an alkyl group having 6 to 8 carbon atoms, and $R_b$ and $R_c$ may be each independently an alkyl group having 2 to 6 carbon atoms.

As described above, since the neodymium compound represented by Formula 7 includes a carboxylate ligand including alkyl groups of various lengths having 2 or more carbon atoms as substituents at an α (alpha) position, coagulation phenomenon of the compound may be blocked by inducing steric changes around the neodymium central metal, and accordingly, oligomerization may be suppressed. Also, since the neodymium compound has high solubility in a solvent, and the ratio of neodymium located in a center portion, which has difficulties in conversion into the catalytically active species, is reduced, the conversion ratio into the catalytically active species is high.

Furthermore, the neodymium compound according to an embodiment of the present invention may have a solubility of about 4 g or more per 6 g of a nonpolar solvent at room temperature (25° C.)

In the present invention, the solubility of the neodymium compound denotes a degree to which the neodymium compound is clearly dissolved without turbidity phenomenon, wherein since the neodymium compound has high solubility as described above, excellent catalyst activity may be achieved.

Also, the neodymium compound according to an embodiment of the present invention may be used in the form of a reactant with a Lewis base. The reactant may improve the solubility of the neodymium compound in the solvent due to the Lewis base and may be stored in a stable state for a long period of time. The Lewis base, for example, may be used in a ratio of 30 mol or less or 1 mole to 10 mol per 1 mol of neodymium. Examples of the Lewis base may be acetylacetone, tetrahydrofuran, pyridine, N,N-dimethylformamide, thiophene, diphenyl ether, triethylamine, an organic phosphorus compound, or a monohydric or dihydric alcohol.

In addition, the lithium-containing compound is a compound activated by the alkylating agent to form a catalytic active species, for example, methyllithium, ethyllithium, propyllithium, n-butyllithium s-butyllithium, t-butyllithium, hexyllithium, n-decyllithium, t-octyllithium, phenyllithium, 1-naphthyl lithium, n-eicosyl lithium, 4-butyl phenyl lithium, 4-tolyllithium, cyclohexyl lithium, 3,5-di-n-heptyl-cyclohexyl lithium, 4-cyclopentyl lithium, lithium alkoxide or lithium amide.

The catalyst composition may include a main catalyst containing compound; an alkylating agent; and a halogen compound. The alkylating agent is capable of delivering a hydrocarbyl group to another metal, and plays the role of a co-catalyst. For example, the alkylating agent may be one or more selected from the group consisting of an organoaluminum compound, an organomagnesium compound and an organolithium compound.

Particularly, the organoaluminum compound may include alkyl aluminums such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; dihydrocarbylaluminum hydrides such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride, or the like. The organomagnesium compound may include alkylmagnesium compounds such as diethylmagnesium, di-n-propylmagnesium, diisopropylmagnesium, dibutylmagnesium, dihexylmagnesium, diphenylmagnesium and dibenzylmagnesium, and the organolithium compound may include alkyl lithium compounds such as n-butyllithium.

In addition, the organoaluminum compound may be aluminoxanes, for example, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane.

Examples of the halide are not specifically limited, but the halide may be a diatomic halogen, an interhalogen compound, a hydrogen halide, an organic halide, a nonmetal halide, a metal halide, or an organometal halide, and any one of them or a mixture of two or more thereof may be used. Among them, considering the improvement of catalyst activity and consequent improving effect of reactivity, the halide may be any one selected from the group consisting of an organic halide, a metal halide and an organometal halide, or a mixture of two or more thereof.

The diatomic halogen may include fluorine, chlorine, bromine, or iodine.

Also, the interhalogen compound may include iodine monochloride, iodine monobromide, iodine trichloride, iodine pentafluoride, iodine monofluoride, iodine trifluoride, etc.

Also, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide, selenium tetraiodide, or the like.

Also, the metal halide may include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In another embodiment, in case where the second synthetic rubber is a conjugated diene-based rubber catalyzed with an alkali metal catalyst, the second synthetic rubber may be prepared by polymerizing a 1,3-butadiene-based monomer or a 1,3-butadiene-based monomer and a conjugated diene-based monomer which is copolymerizable therewith in the presence of a polar additive in a hydrocarbon solvent including an alkali metal, and modification reaction or coupling reaction with a modifier may be further performed after the polymerization as necessary. In this case, the microstructure of the second synthetic rubber, for example, the 1,2-vinyl bond content may be controlled by the amount used of the polar additive.

The modifier may be, for example, the above-described compound represented by Formula 5 or Formula 6, and one or a mixture of two or more materials may be used. That is, the modifier may be Formula 5, Formula 6 or a combination thereof.

Meanwhile, in the first synthetic rubber and the second synthetic rubber, the microstructure in each rubber, for example, the 1,2-vinyl bond content, the styrene bond content, the cis 1,4-bond content and the trans-bond content may be measured using a measurement apparatus such as NMR and Fourier transform infrared spectroscopy (FT-IR).

For example, in case of using NMR, the microstructure may be analyzed by calculating the styrene bond and 1,2-vinyl bond contents using Varian VNMR 500 MHz NMR, using 1,1,2,2-tetrachloroethane as a solvent, and regarding 5.97 ppm as a solvent peak, 7.2-6.9 ppm as random styrene peaks, 6.9-6.2 ppm as block styrene peaks, 5.8-5.1 ppm as 1,4-vinyl bond peaks, and 5.1-4.5 ppm as 1,2-vinyl bond peaks.

In another embodiment, in case of using FT-IR, the microstructure may be analyzed after measuring a FT-IR transmittance spectrum of a carbon disulfide solution of the rubber which is prepared at a concentration of 5 mg/mL by using disulfide carbon of the same cell as a blank, and obtaining each content by using a maximum peak value (a, base line) near 1,130 cm$^{-1}$ of the measurement spectrum, a minimum peak value (b) near 967 cm$^{-1}$ which indicates a trans 1,4 bond, a minimum peak value (c) near 911 cm$^{-1}$ which indicates a vinyl bond, and a minimum peak value (d) near 736 cm$^{-1}$ which indicates a cis-1,4 bond.

Filler

In an embodiment of the present invention, the filler may be mixed with the rubber components to play the role of improving the physical properties of the rubber composition, and may particularly be silica.

For example, the silica may be wet silica (hydrated silicate), dry silica (anhydrous silicate), calcium silicate, aluminum silicate, or colloid silica. Particularly, the silica may be the wet silica which has the most significant improving effect of destruction characteristics and compatible effect of wet grip.

Meanwhile, the rubber composition according to an embodiment of the present invention may further include other rubber components, as necessary, in addition to the rubber components described above, and in this case, the other rubber components may be included in an amount of 90 wt % or less based on the total weight of the rubber composition.

The other rubber component may be, for example, natural rubber or synthetic rubber, and may particularly be natural rubber (NR) including cis-1,4-polyisoprene; modified natural rubber which is obtained by modifying or purifying common natural rubber, such as epoxidized natural rubber (ENR), deproteinized natural rubber (DPNR), and hydrogenated natural rubber; and synthetic rubber such as a styrene-butadiene copolymer (SBR), polybutadiene (BR), polyisoprene (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, epichlorohydrin rubber, and halogenated butyl rubber, and any one or a mixture two or more thereof may be used.

In addition, the rubber composition according to an embodiment of the present invention may be sulfur cross-linkable, and so may further include a vulcanizing agent.

The vulcanizing agent may particularly be a sulfur powder and may be included in an amount of 0.1 parts by weight to 10 parts by weight based on 100 parts by weight of a rubber component. With the amount used in the above range, elasticity and strength required for a vulcanized rubber composition may be secured, and at the same time, an excellent low fuel consumption ratio may be achieved.

In addition, if silica is used as the filler, a silane coupling agent may be used together in the rubber composition according to an embodiment of the present invention for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition, and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of a vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or a tire tread.

Hereinafter, the present invention will be explained in more detail referring to embodiments. However, the embodiments are for illustrating the present invention, and the scope of the present invention is not limited thereto.

Preparation Example 1

To a 20 L autoclave reactor, 3 kg of n-hexane and 860 g of 1,3-butadiene were injected, 3.2 g (10 wt % in n-hexane) of n-butyllithium was injected, and 2,2-di(tetrahydrofuryl)propan (DTHFP) was injected (molar ratio of [DTHFP]:[act. Li]=4:1), and then, the internal temperature of the reactor was elevated to 60° C. and adiabatic reaction with heating was performed. After about 30 minutes lapse, 39 g of 1,3-butadiene was injected for capping the terminals of a polymer with butadiene. After about 10 minutes, N-(3-(1H-imidazol-1-yl)propyl)-3-(trimethoxysilyl)-N-(3-(trimethoxysilyl)propyl)propan-1-amine was injected as a modifier and reacted for 15 minutes (molar ratio of [modifier]:[act. Li]=1:1), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a solution-polymerized modified butadiene polymer having the styrene content of 0 wt %, the 1,2-vinyl content of 80 wt %, and the glass transition temperature of −25° C. Hereinafter, this specimen was named as HVBR-A in the examples.

Meanwhile, the styrene bond content and the 1,2-vinyl bond content in the modified butadiene polymer are values obtained by measuring and analyzing using Varian VNMR 500 MHz NMR. Particularly, the styrene bond content and the 1,2-vinyl bond content were calculated by using 1,1,2,2-tetrachloroethane as a solvent during measurement, and regarding 5.97 ppm as a solvent peak, 7.2-6.9 ppm as random styrene peaks, 6.9-6.2 ppm as block styrene peaks, 5.8-5.1 ppm as 1,4-vinyl bond peaks, and 5.1-4.5 ppm as 1,2-vinyl bond peaks.

In addition, the glass transition temperature was obtained based on ISO 22768:2006, by using a differential scanning calorimeter (DSCQ100, TA Co.). Under nitrogen distribution in a rate of 50 ml/min, a DSC curve was recorded while elevating the temperature from −100° C. in a rate of 10° C./min, and the peak top (inflection point) of the DSC differential curve was considered as the glass transition temperature.

Preparation Example 2

A modified butadiene polymer having the styrene content of 0 wt %, the 1,2-vinyl content of 50 wt %, and the glass transition temperature of −54° C. was prepared by performing the same method in Preparation Example 1 except for injecting 2,2-di(tetrahydrofuryl)propane (DTHFP) in a molar ratio of [DTHFP]:[act. Li]=2:1 in Preparation Example 1. Hereinafter, this specimen was named as HVBR-B in the examples. In addition, the styrene content, the 1,2-vinyl content and the glass transition temperature were measured by the same method in Preparation Example 1.

Preparation Example 3

To a 20 L autoclave reactor, 3 kg of n-hexane and 860 g of 1,3-butadiene were injected, 3.2 g (10 wt % in n-hexane) of n-butyllithium was injected, and 2,2-di(tetrahydrofuryl)propan (DTHFP) was injected (0.001 parts by weight in contrast to 100 parts by weight of 1,3-butadiene), and then, the internal temperature of the reactor was elevated to 60° C. and adiabatic reaction with heating was performed. After about 30 minutes lapse, 39 g of 1,3-butadiene was injected for capping the terminals of a polymer with butadiene. After about 10 minutes, N-(3-(1H-imidazol-1-yl)propyl)-3-(trimethoxysilyl)-N-(3-(trimethoxysilyl)propyl)propan-1-amine was injected as a modifier and reacted for 15 minutes (molar ratio of [modifier]:[act. Li]=1:1). Then, the reaction was quenched using ethanol, and 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified lithium-catalyzed polymer having the styrene content of 0 wt %, the 1,2-vinyl bond content of 10 wt %, and the glass transition temperature of −88° C. Hereinafter, this specimen was named as LiBR-C in the examples. In addition, the styrene content, the 1,2-vinyl content and the glass transition temperature were measured by the same method in Preparation Example 1.

Comparative Preparation Example

To a 20 L autoclave reactor, 4.2 kg of n-hexane, 124 g of styrene and 676 g of 1,3-butadiene were injected, 4.6 g (10 wt % in n-hexane) of n-butyllithium was injected, and 2,2-di(tetrahydrofuryl)propan (DTHFP) was injected (molar ratio of [DTHFP]:[act. Li]=0.3:1), and then, the internal temperature of the reactor was elevated to 60° C. and adiabatic reaction with heating was performed. After about 30 minutes lapse, 40 g of 1,3-butadiene was injected for capping the terminals of a polymer with butadiene. After about 10 minutes, N-(3-(1H-imidazol-1-yl)propyl)-3-(trimethoxysilyl)-N-(3-(trimethoxysilyl)propyl)propan-1-amine was injected as a modifier and reacted for 15 minutes (molar ratio of [modifier]:[act. Li]=1:1). Then, the reaction was quenched using ethanol, and 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a solution-polymerized modified styrene-butadiene copolymer having the styrene content of 15 wt %, the 1,2-vinyl bond content of 25 wt %, and the glass transition temperature of −63° C. Hereinafter, this specimen was named as SSBR-D in the examples. In addition, the styrene content, the 1,2-vinyl content and the glass transition temperature were measured by the same method in Preparation Example 1.

Hereinafter, the parts by weight of other components excluding the rubber component were shown based on 100 parts by weight of the rubber component used in the Examples and Comparative Examples, and here, the rubber component means only pure rubber excluding oil in each rubber used in the Examples and Comparative Examples.

In addition, other components excluding the rubber component in the Examples and Comparative Examples were the same materials, and bis(3-triethoxysilylpropyl)tetrasulfide (TESPT) was used as a coupling agent, TDAE oil was used as a process oil, and N-cyclohexyl-2-benzothiazylsulfenamide (CZ) and diphenylguanidine (DPG) were used as vulcanization accelerators.

Example 1

65 parts by weight of the solution-polymerized modified butadiene rubber prepared in Preparation Example 1 (styrene content of 0 wt %, 1,2-vinyl content of 80 wt %, and glass transition temperature of −25° C.) (HVBR-A), 35 parts by weight of an unmodified neodymium-catalyzed butadiene rubber (cis 1,4-bond content of 96 wt %, glass transition temperature of −105° C.), (GND45, LG Chem), 95 parts by weight of silica, 7.6 parts by weight of a coupling agent, 40 parts by weight of a process oil, 3 parts by weight of zinc oxide, and 2 part by weight of stearic acid were mixed to prepare a first compounding product, and 1.5 parts by weight of a sulfur powder and 2.8 parts by weight of a vulcanization accelerator were mixed therewith to prepare a rubber composition. In this case, an interaction parameter of the solution-polymerized modified butadiene rubber and the unmodified neodymium-catalyzed butadiene rubber was $5.6216 \times 10^{-3}$.

Example 2

55 parts by weight of the solution-polymerized modified butadiene rubber prepared in Preparation Example 2 (styrene content of 0 wt %, 1,2-vinyl content of 50 wt %, and glass transition temperature of −54° C.) (HVBR-B), 45 parts by weight of an unmodified neodymium-catalyzed butadiene rubber (cis 1,4-bond content of 96 wt %, glass transition temperature of −105° C.), (GND45, LG Chem), 120 parts by weight of silica, 6.5 parts by weight of a coupling agent, 45 parts by weight of a process oil, 3 parts by weight of zinc oxide, and 2 part by weight of stearic acid were mixed to prepare a first compounding product, and 1.1 parts by weight of a sulfur powder and 4.8 parts by weight of a vulcanization accelerator were mixed therewith to prepare a rubber composition. In this case, an interaction parameter of the solution-polymerized modified butadiene rubber and the unmodified neodymium-catalyzed butadiene rubber was $2.1627 \times 10^{-3}$.

Example 3

10 parts by weight of the solution-polymerized modified butadiene rubber prepared in Preparation Example 1 (styrene content of 0 wt %, 1,2-vinyl content of 80 wt %, and glass transition temperature of −25° C.) (HVBR-A), 90 parts by weight of a modified lithium-catalyzed butadiene rubber (styrene content of 0 wt %, 1,2-vinyl bond content of 10 wt %, glass transition temperature of −88° C.), (LiBR-C), 120 parts by weight of silica, 6.5 parts by weight of a coupling agent, 45 parts by weight of a process oil, 3 parts by weight of zinc oxide, and 2 part by weight of stearic acid were mixed to prepare a first compounding product, and 1.1 parts by weight of a sulfur powder and 4.8 parts by weight of a vulcanization accelerator were mixed therewith to prepare a rubber composition. In this case, an interaction parameter of the solution-polymerized modified butadiene rubber and the modified lithium-catalyzed butadiene rubber was $4.4137 \times 10^{-3}$.

Comparative Example 1

A rubber composition was prepared by the same method in Example 1 except for using a solution-polymerized single terminal-modified styrene-butadiene rubber (styrene content of 21 wt %, 1,2-vinyl bond content of 50 wt %, and glass transition temperature of −26° C.) (F2150, LG Chem) instead of the solution-polymerized modified butadiene rubber prepared in Preparation Example 1. In this case, an interaction parameter of the solution-polymerized single terminal-modified styrene-butadiene rubber and the unmodified neodymium-catalyzed butadiene rubber was $1.5561 \times 10^{-3}$.

Comparative Example 2

A rubber composition was prepared by the same method in Example 1 except for using a solution-polymerized both terminal-modified styrene-butadiene rubber (styrene content of 39 wt %, 1,2-vinyl bond content of 25 wt %, and glass transition temperature of −23° C.) (M3925, LG Chem) instead of the solution-polymerized modified butadiene rubber prepared in Preparation Example 1. In this case, an interaction parameter of the solution-polymerized both terminal-modified styrene-butadiene rubber and the unmodified neodymium-catalyzed butadiene rubber was $3.8231 \times 10^{-3}$.

Comparative Example 3

A rubber composition was prepared by the same method in Example 2 except for using a solution-polymerized both terminal-modified styrene-butadiene rubber (styrene content of 15 wt %, 1,2-vinyl bond content of 25 wt %, and glass transition temperature of −60° C.) (SSBR-D) instead of the solution-polymerized modified butadiene rubber (HVBR) prepared in Preparation Example 2. In this case, an interaction parameter of the solution-polymerized both terminal-modified styrene-butadiene rubber and the unmodified neodymium-catalyzed butadiene rubber was $0.0519\times10^{-3}$.

Experimental Examples

In order to compare and analyze the physical properties of the rubber compositions prepared in the Examples and Comparative Examples, and molded articles therefrom, abrasion resistance and viscoelasticity properties were measured, and the results are shown in Table 1 and Table 2 below. In addition, rubber components, other components, and the amounts thereof used for preparing the rubber compositions of the Examples and Comparative Examples are shown together in Table 1 and Table 2.

1) Abrasion Resistance

The abrasion resistance of the rubber specimen manufactured by the same method described in the tensile properties was measured using a DIN abrasion tester, where a worn loss weight was measured after applying a load of 10 N to a rotation drum to which an abrasion paper was attached, and moving the rubber specimen to a perpendicular direction of the rotational direction of the drum. The abrasion resistance was index based on the loss weight of Comparative Example 1 or Comparative Example 3. The rotation speed of the drum was 40 rpm, and a total moving distance of the specimen after finishing the test was 40 m. The greater the index value of the loss weight is, the better the abrasion resistance is.

2) Viscoelasticity Properties

The viscoelasticity properties were measured by measuring G" (dynamic loss modulus, E") and tan δ by changing deformation at each measurement temperature (−100° C.-80° C.) with a frequency of 10 Hz in a twist mode by using a dynamic mechanical analyzer (TA Co., ARES G2). If the index value of tan δ at a low temperature of 0° C. increases, wet skid resistance (braking performance) becomes better, and if the index value of tan δ at a high temperature of 70° C. increases, hysteresis loss decreases, and rotation resistance (fuel consumption ratio) becomes better.

In addition, by performing a temperature sweep test through the dynamic mechanical analyzer, G" change was measured, and through this, phase separation phenomenon due to compatibility difference among rubbers was secured. The results are shown in the FIGURE.

TABLE 1

| Division | | Comparative Example 1 | Comparative Example 2 | Example 1 |
|---|---|---|---|---|
| First synthetic rubber | HVBR-A | — | — | 65 |
| | F2150 | 65 | — | — |
| | M3925 | — | 65 | — |
| Second synthetic rubber | GND45 | 35 | 35 | 35 |
| Rubber component (parts by weight) | | 100 | 100 | 100 |
| Interaction parameter ($\times10^{-3}$) | | 1.5561 | 3.8231 | 5.6216 |
| Silica | | 95 | 95 | 95 |
| Coupling agent | | 7.6 | 7.6 | 7.6 |

TABLE 1-continued

| Division | | Comparative Example 1 | Comparative Example 2 | Example 1 |
|---|---|---|---|---|
| Process oil | | 40 | 40 | 40 |
| Zinc oxide | | 3 | 3 | 3 |
| Stearic acid | | 2 | 2 | 2 |
| Sulfur powder | | 1.5 | 1.5 | 1.5 |
| Vulcanization accelerator | | 2.8 | 2.8 | 2.8 |
| Physical properties (Index, %) | | | | |
| Abrasion resistance | | 100 | 89 | 103 |
| Viscoelasticity | tan δ @ 0° C. | 100 | 109 | 101 |
| | tan δ @ 70° C. | 100 | 96 | 107 |

In Table 1 above, the resultant values of the physical properties of Example 1 and Comparative Example 2 were indexed based on the measurement values of Comparative Example 1 and shown.

TABLE 2

| Division | | Comparative Example 3 | Example 2 | Example 3 |
|---|---|---|---|---|
| First synthetic rubber | HVBR-A | — | — | 10 |
| | HVBR-B | — | 55 | — |
| | SSBR-D | 55 | — | — |
| Second synthetic rubber | GND45 | 45 | 45 | — |
| | LiBR-C | — | — | 90 |
| Rubber component (parts by weight) | | 100 | 100 | 100 |
| Interaction parameter ($\times10^{-3}$) | | 0.5191 | 2.1627 | 4.4137 |
| Silica | | 120 | 120 | 120 |
| Coupling agent | | 6.5 | 6.5 | 6.5 |
| Process oil | | 45 | 45 | 45 |
| Zinc oxide | | 3 | 3 | 3 |
| Stearic acid | | 2 | 2 | 2 |
| Sulfur powder | | 1.1 | 1.1 | 1.1 |
| Vulcanization accelerator | | 4.8 | 4.8 | 4.8 |
| Physical properties (Index, %) | | | | |
| Abrasion resistance | | 100 | 105 | 100 |
| viscoelasticity | tan δ @ 0° C. | 100 | 101 | 108 |
| | tan δ @ 70° C. | 100 | 102 | 107 |

In Table 2, the resultant values of the physical properties of Example 2 and Example 3 were indexed based on the measurement values of Comparative Example 3 and shown. As shown in Table 1 and Table 2, it was confirmed that Example 1 to Example 3 according to embodiments of the present invention showed improved abrasion resistance and viscoelasticity properties in contrast to Comparative Examples 1 to 3.

Particularly, in Example 1, the abrasion resistance was improved by 3% or more and at the same time, the tan δ @ 70° C. was markedly improved by 7% or more in contrast to Comparative Example 1, and the tan δ @ 0° C. was reduced but the abrasion resistance was markedly improved by about 17% and the tan δ @ 70° C. was markedly improved by about 11% in contrast to Comparative Example 2, and accordingly, the overall physical properties of the abrasion resistance and viscoelasticity properties were markedly improved.

In addition, the abrasion resistance and viscoelasticity properties of Example 2 and Example 3 were improved in contrast to Comparative Example 3 on the whole, wherein Example 2 showed particularly improved abrasion resistance, and Example 3 showed particularly improved viscoelasticity properties.

In this case, in Comparative Example 1, heterogeneous synthetic rubbers were used, and the interaction parameter between the synthetic rubbers was deviated from the range suggested in the present invention. In Comparative Example 2 and Comparative Example 3, the interaction parameter was in the range suggested in the present invention, but a first synthetic rubber did not include the first synthetic rubber suggested in the present invention.

In addition, as shown in the FIGURE, it could be confirmed that Example 1 showed two inflection points, but Comparative Example 1 showed one inflection point. Here, the inflection point is generally judged by glass transition temperature, and accordingly, two inflection points represent the presence of two glass transition temperatures. That is, in Example 1, the interaction parameter between two synthetic rubbers was controlled to a specific range, and the compatibility was controlled so that each rubber component in a rubber composition was mixed into an incompletely uniform state. Accordingly, due to the phase separation of the two synthetic rubbers, two glass transition temperatures were shown. In Comparative Example 1, the interaction parameter constant difference between two synthetic rubbers was small, each rubber component in a rubber composition was mixed in a completely uniform state, and one phase was shown, and one glass transition temperature was shown.

Through the results above, it could be confirmed that Example 1 to Example 3 included two synthetic rubbers of which specific physical properties were defined, wherein the interaction parameter between two synthetic rubbers was controlled to a specific range or more to control the compatibility such that each rubber component in a rubber composition could not be mixed into a completely uniform state, and accordingly, effects shown by each synthetic rubber due to phase separation could be maintained, and abrasion resistance and viscoelasticity were excellent in balance. In contrast, in Comparative Example 1, the interaction parameter between two synthetic rubbers was small, each rubber components in a rubber composition were mixed into a completely uniform state, and accordingly, effects shown by each synthetic rubber could not be maintained, and in Comparative Example 2 and Comparative Example 3, physical properties of synthetic rubbers did not satisfied the physical properties suggested in the present invention, and accordingly, the combination of two synthetic rubbers was inappropriate in view of the physical properties, and though the compatibility was controlled, uniformly excellent abrasion resistance and viscoelasticity properties could not be shown.

The invention claimed is:

1. A rubber composition comprising:
   a first synthetic rubber; and
   a second synthetic rubber,
   wherein the first synthetic rubber is a solution-polymerized modified conjugated diene-based rubber which has a 1,2-vinyl bond content of 60 wt % to 90 wt %, and of which at least one terminal is bonded to a functional group;
   the second synthetic rubber is a conjugated diene-based rubber which has a 1,2-vinyl bond content of less than 40 wt %,
   an interaction parameter ($\chi_{blend}$) defined by the following Mathematical Formula 1 at room temperature is $2.0 \times 10^{-3}$ or more and $10.0 \times 10^{-3}$ or less, wherein the interaction parameter is an interaction measurement determined according to 1,2-vinyl bond and styrene bond microstructure in the rubber composition,
   wherein the second synthetic rubber is a lithium catalyzed conjugated diene based rubber;
   wherein the second synthetic rubber is a modified conjugated diene-based rubber in which a functional group is bonded to at least one terminal; and
   the interaction parameter ($X_{blend}$) is defined by:

$$X_{blend} = K\varphi_S X_{VS} + (\varphi_S - K)\varphi_S X_{BS} - K(\varphi_S - K)X_{VB} \quad [\text{Mathematical Formula 1}]$$

in Mathematical Formula 1,
K is $Y - X(1 - \varphi_S)$, $\varphi_s$ is a volume ratio of a styrene bond in the first synthetic rubber, X is a volume ratio of a 1,2-vinyl bond in the first synthetic rubber, Y is a volume ratio of a 1,2-vinyl bond in the second synthetic rubber, $X_{VS}$ is $0.05650 + 5.65T^{-1}$, $X_{BS}$ is $0.00843 + 10.2T^{-1}$, and $X_{VB}$ is $0.00269 + 1.87T^{-1}$.

2. The rubber composition of claim 1, wherein the interaction parameter defined by Mathematical Formula 1 at room temperature is $2.5 \times 10^{-3}$ or more and $10.0 \times 10^{-3}$ or less.

3. The rubber composition of claim 1, wherein a glass transition temperature of the first synthetic rubber is higher than a glass transition temperature of the second synthetic rubber.

4. The rubber composition of claim 1, wherein a glass transition temperature of the first synthetic rubber is −60° C. to −10° C., and a glass transition temperature of the second synthetic rubber is −110° C. to −70° C.

5. The rubber composition of claim 1, wherein the second synthetic rubber comprises 10 wt % to 30 wt % of a cis 1,4-bond content, and 15 wt % or less of a 1,2-vinyl bond content.

6. The rubber composition of claim 1, further comprising a filler.

7. The rubber composition of claim 6, wherein the first synthetic rubber is present in an amount of 30 parts by weight to 90 parts by weight,
   Wherein the second synthetic rubber is present in an amount of 10 parts by weight to 90 parts by weight, and the filler is present in an amount of 30 parts by weight to 200 parts by weight, based on 100 parts by weight of a rubber component comprising the first synthetic rubber and the second synthetic rubber.

8. The rubber composition of claim 1, further comprising a vulcanizing agent.

9. The rubber composition of claim 1, further comprising one or more additives selected among a vulcanization accelerator, a process oil, and an antiaging agent.

10. A molded article manufactured from the rubber composition of claim 1.

* * * * *